United States Patent
Lannert et al.

[11] Patent Number: 6,045,133
[45] Date of Patent: *Apr. 4, 2000

[54] SEALING ARRANGEMENT

[75] Inventors: Berthold Lannert, Fürth; Hans-Gerd Eckel, Laudenbach; Horst Kober; Stefan Burger, both of Weinheim, all of Germany

[73] Assignee: Firma Carl Freudenberg, Weinheim, Germany

[*] Notice: Under 35 U.S.C. 154(b), the term of this patent shall be extended for 249 days.

[21] Appl. No.: 08/590,859

[22] Filed: Jan. 24, 1996

[30] Foreign Application Priority Data

Feb. 3, 1995 [DE] Germany ............... 195 03 468

[51] Int. Cl.[7] ............................................. F16J 15/32
[52] U.S. Cl. ........................... 277/321; 277/566; 384/448
[58] Field of Search .................................. 384/485, 486, 384/448; 277/321, 549, 562, 566

[56] References Cited

U.S. PATENT DOCUMENTS

| | | | |
|---|---|---|---|
| 4,161,120 | 7/1979 | Cloarec | 73/494 |
| 4,505,484 | 3/1985 | Ohkuma et al. | 384/486 |
| 4,830,518 | 5/1989 | Shiratani et al. | 384/448 |
| 4,850,722 | 7/1989 | Bayer | 384/448 |
| 4,948,277 | 8/1990 | Alff | 384/448 |
| 5,017,868 | 5/1991 | Hajzler | 324/207.22 |
| 5,026,178 | 6/1991 | Ballhaus | 384/448 |
| 5,131,763 | 7/1992 | Caron | 384/448 |
| 5,133,609 | 7/1992 | Ishiguro | 384/486 |
| 5,261,753 | 11/1993 | Endoh et al. | 400/124 |
| 5,407,213 | 4/1995 | Ouchi et al. | 277/2 |
| 5,431,413 | 7/1995 | Hajzler | 277/2 |
| 5,476,272 | 12/1995 | Hixson, II | 277/152 |
| 5,530,344 | 6/1996 | Caillaut et al. | 324/174 |

FOREIGN PATENT DOCUMENTS

| | | |
|---|---|---|
| 375019 | 6/1990 | European Pat. Off. . |
| 378939 | 7/1990 | European Pat. Off. . |
| 2574501 | 12/1984 | France . |
| 2917232 | 11/1979 | Germany . |
| 1181045 | 2/1970 | United Kingdom .......... 384/486 |
| 2110773 | 6/1983 | United Kingdom .......... 384/485 |

*Primary Examiner*—Anthony Knight
*Assistant Examiner*—John L. Beres
*Attorney, Agent, or Firm*—Kenyon & Kenyon

[57] ABSTRACT

A sealing arrangement which includes a sealing ring with a support ring extending substantially in the radial direction and is joined in the radial direction on one end to a first sealing element that lies in sealing contact with a first machine element nonrotatably with respect thereto and in a statically sealing manner, and is joined in the radial direction on another end to a second sealing element that is placed against a second machine element rotatably with respect thereto and in a dynamically sealing manner. The first and second sealing elements are each made of an elastomeric material, and the sealing ring has, in order to sense rotational movements of the first machine element about its axis, at least one auxiliary device that can move past a rotational speed sensor. The auxiliary device may be a multipole ring, rotatable together with the first machine element about its axis, that is made of a magnetizable material. The multipole ring may have north and south poles alternating in the circumferential direction and extending in the radial direction.

8 Claims, 2 Drawing Sheets

SEALING ARRANGEMENT

BACKGROUND OF THE INVENTION

1. Field of the Invention

The present invention concerns a sealing arrangement, including a sealing ring with a support ring extending substantially in the radial direction. The support ring is joined in the radial direction to a first sealing element that lies in contact with a first machine element and is nonrotatable with respect to the machine element and statically seals the machine element. The first sealing element also is joined in the radial direction to a second sealing element that is placed against a second machine element rotatable with respect to the second sealing element in a dynamically sealing manner. The first and second sealing elements are each made of an elastomeric material, and the sealing ring has, in order to sense rotational movements of the first machine element about its axis, at least one auxiliary device that can move past a rotational speed sensor.

2. Description of the Prior Art

Sealing arrangements are generally known and are used, for example, to seal wheel bearings in motor vehicles. If the motor vehicle is equipped with an ABS antilock braking system, the sealing arrangement includes an inductive transducer to sense the rotational speed of the vehicle wheel. The transducer, which rotates along with the vehicle wheel and usually consists of a disk made of metallic material with surface discontinuities regularly distributed in the circumferential direction, is movable past a rotational speed sensor. The surface discontinuities can consist, for example, of recesses or impressions distributed in the circumferential direction. The manufacture of such sealing arrangements is complex and unsatisfactory from an economic standpoint. In addition, a sealing ring equipped with a metal sensor ring has a comparatively large mass. When the surface discontinuities are acted upon by contaminants, for example splashed water, dust, and/or mud, errors in transmission to the rotational speed sensor can occur, thus impairing reliable determination of rotational speed.

SUMMARY OF THE INVENTION

It is the object of the present invention to eliminate the above-described disadvantages and provide a sealing arrangement that can be manufactured easily and cost-effectively, has outstanding service characteristics in terms of sealing and rotational speed sensing over a long service life, and is of comparatively light weight.

To achieve the objects of the present invention, provision is made for a multipole ring, rotatable together with the first machine element about its axis, that is made of a magnetizable such as, inter alia, natural rubber such as acrylonitrile-butadiene-rubbers with magnetizable metallic particles contained therein, material, and for the multipole ring to have north and south poles alternating in the circumferential direction and extending in the radial direction. A sealing ring configured in this manner is easy and economical to manufacture in terms of production engineering, has low weight, and allows consistently good pulse transmission to the rotational speed sensor over a long service life. The magnetized elastomeric material moves together with the first machine element about its axis and relative to the stationary rotational speed sensor, the north and south poles of the multipole ring moving alternately, for inductive sensing of the rotational movement, past the stationary rotational speed sensor.

The first sealing element, the multipole ring, and the second sealing element are preferably adhesively bonded to the support ring, and the multipole ring is arranged on the side of the support ring facing the rotational speed sensor. Since the first sealing element, the multipole ring, and the second sealing element are made of elastomeric material, they can be vulcanized to the support ring in one procedure. In the interest of economical manufacturability, the support ring preferably is a deep-drawn sheet-metal part.

According to an advantageous embodiment, the first sealing element and the multipole ring can be made integrally and continuously with one another of a uniform material. The advantage of such a construction is that in addition to the multipole ring, the first sealing element is also made of a magnetized elastomeric material, thus improving adhesive fit on the first machine element due to increased adhesion, and consequently also improving static sealing with respect to the first machine element. In addition, manufacture of the sealing ring is further simplified by a configuration of this kind, since no more than two different elastomeric materials with service characteristics differing from one another are used. To improve the adhesive fit of the first sealing element on the first machine element, the first machine element can be made of a metallic material, for example the outer bearing shell of a rolling bearing.

The first sealing element and the multipole ring can preferably be configured, without the abrupt changes in cross section, integrally and continuously with one another, and have substantially identical material thicknesses. Accumulations of material that are undesirable in terms of production engineering and which can cause shrinkage stresses of different magnitudes during the vulcanization process are reliably prevented by an embodiment of this kind. Uncomplicated manufacture of the sealing ring is simplified by an embodiment of this kind.

The support ring and the first and the second machine elements are each made of a metallic material, the first and the second machine elements being, for example, the outer and inner ring of a rolling bearing, and the support ring being made of a deep-drawable metallic material. In the region of the static seal between the first machine element and the first sealing element, it is advantageous that, in addition to the first sealing element being under radial preload at the surface of the first machine element, the magnetized elastomeric material of the first sealing element results in improved adhesion and thus in improved sealing in this region.

The first sealing element can be sealingly braced in a groove, open toward the second machine element, of the first machine element. It is advantageous in an arrangement of this kind that the first sealing element is protected from undesired external influences, for example from the impact of contaminants, and the snap-in attachment of the first sealing element into the groove assists in positioning the sealing ring between the two machine elements.

The second sealing element can lie in contact with the second machine element with at least two sealing lips, the sealing lips being oriented adjacent to one another with axial spacing. The annular cavity is delimited by the sealing lips and the second machine element and is capable of being filled with a barrier grease. Dynamic sealing between the sealing lips and the second machine element, rotatable relative thereto, is improved when the cavity is filled with the barrier grease. An embodiment of this type has proven advantageous in particular when the sealing arrangement is exposed to a severe contaminant impact. The contaminants are largely excluded by the sealing lip facing away from the space to be sealed. On the other hand, contaminants that have bypassed the sealing lip facing away from the space to be sealed do not, because of the barrier grease, reach the sealing lip facing toward the space to be sealed. Abrasive wear of the sealing lip facing the space to be sealed is negligibly low over a long service lifetime of the sealing ring, because of the cavity filled with barrier grease. The sealing ring provides excellent sealing over a very long service lifetime.

The first sealing element, the multipole ring, and the second sealing element can completely cover the support ring on the side facing away from the space to be sealed. A support ring made of a deep-drawn sheet-metal part is thereby reliably protected from corrosion.

The sealing arrangement can preferably be used to seal a rolling bearing in the wheel hub of a motor vehicle and to sense rotational movements of the vehicle wheel, the outer ring of the rolling bearing constituting the first machine element and the inner ring of the rolling bearing constituting the second machine element. The inner ring of the rolling bearing is joined to the axle nonrotatably relative thereto. The outer ring rotates, upon movement of the vehicle, along with the sealing ring and the vehicle wheel at the same rotational velocity about the axis and the second machine element. The rotational speed sensor is arranged immovably relative to the inner ring of the rolling bearing, configured as the second machine element.

BRIEF DESCRIPTION OF THE DRAWINGS

An exemplary embodiment of the sealing arrangement according to the invention is explained in more detail below with reference to FIG. 1 in which the individual components of the sealing arrangement to be taken into consideration are shown in the drawing in a schematic, cross-sectional depiction.

DETAILED DESCRIPTION OF THE INVENTION

Figure 1:
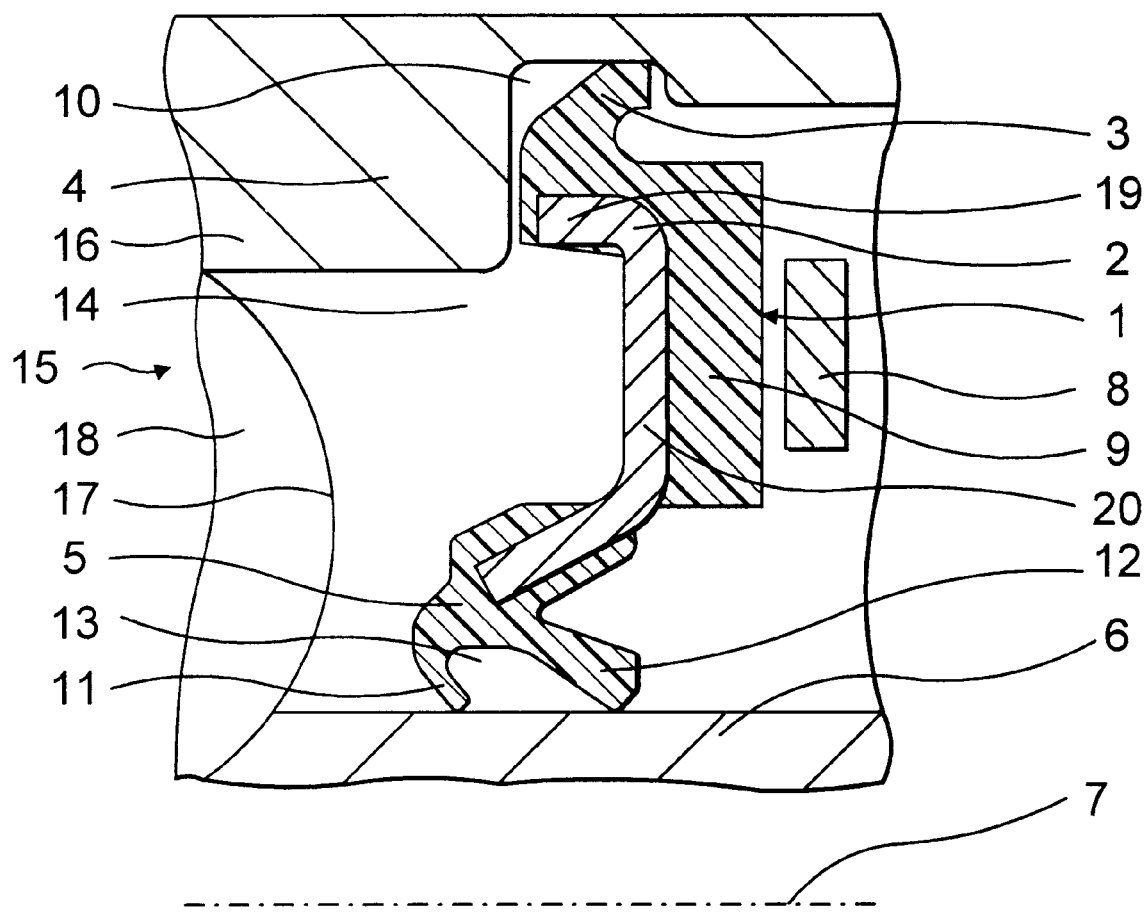
Figure 2:
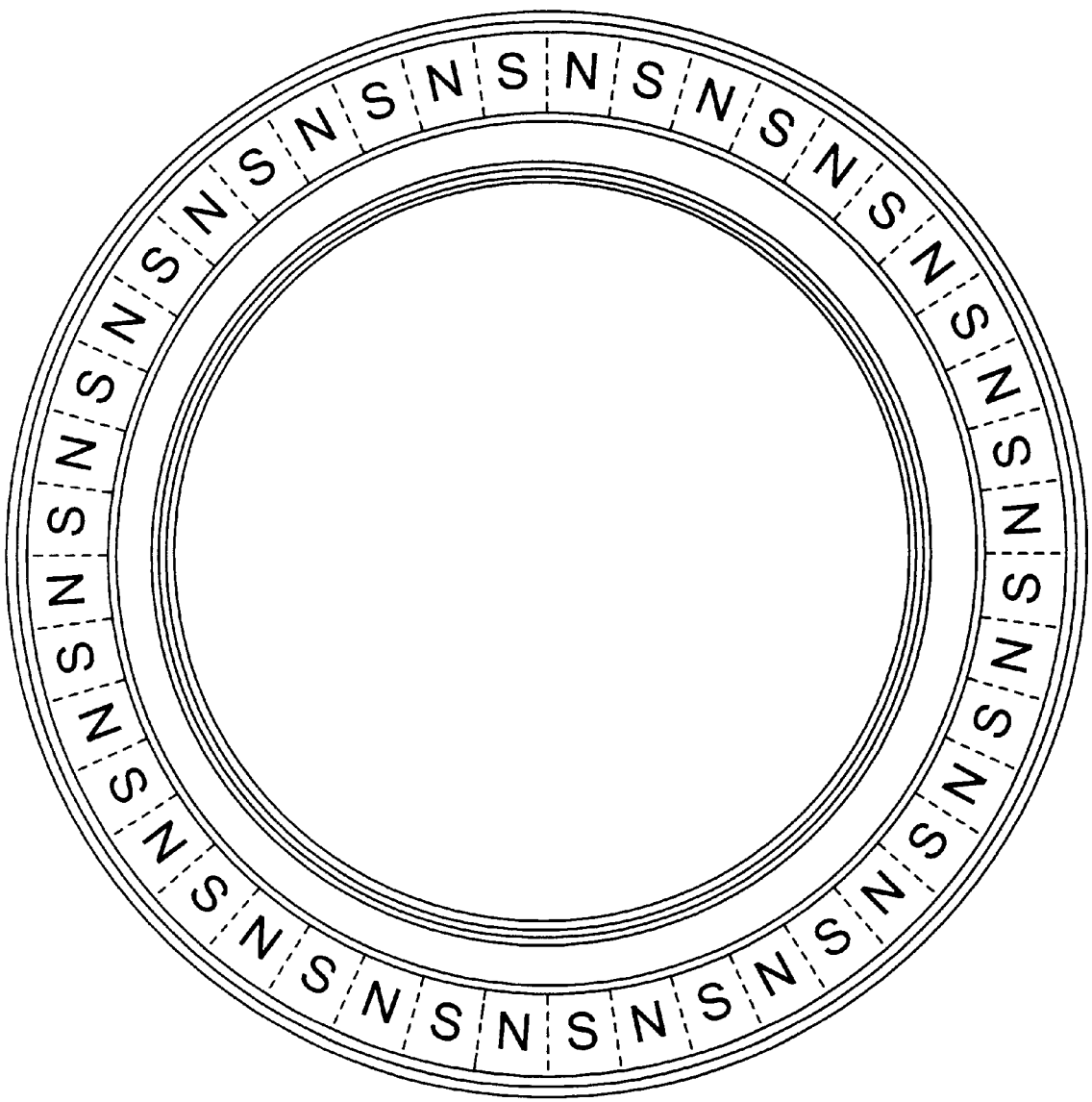
FIG. 2 shows a top view of the sealing ring of FIG. 1.

The drawing figure shows a sealing arrangement that includes a sealing ring 1 that is arranged in the radial direction between first and second machine elements 4, 6. In this exemplary embodiment the sealing arrangement is a component of a wheel suspension of a motor vehicle, and the first and second machine elements 4, 6 are components of a wheel bearing that is configured as a rolling bearing 15. Rolling bearing 15 includes an outer ring 16 and an inner ring 17, which are braced rotatably relative to one another by rolling elements 18 distributed in the circumferential direction. Sealing ring 1, which is joined nonrotatably relative to outer ring 16 of rolling bearing 15, includes a first sealing element 3 for static sealing with respect to outer ring 16, and a second sealing element 5 for dynamic sealing with respect to the inner ring 17. Second sealing element 5 is braced on inner ring 17 with two sealing lips 11, 12 axially adjacent to one another. Sealing lips 11, 12, along with inner ring 17, define an annular cavity which may be filled with a barrier grease.

A multipole ring 9, that is arranged on the side of support ring 2 of sealing ring 1 facing rotational speed sensor 8, is provided in order to sense the rotational movement of outer ring 16, which is joined nonrotatably to the vehicle wheel (not depicted here). Multipole ring 9 is made of a magnetized elastomeric material and has north and south poles alternating in the circumferential direction and extending in the radial direction which, as the vehicle wheel rotates, move alternately past the rotational speed sensor.

In the exemplary embodiment, the multipole ring 9 and the first sealing element 3 are configured integrally and continuously with one another of a uniform material, so that first sealing element 3 is also made of the same magnetized elastomeric material as multipole ring 9. In this exemplary embodiment, outer ring 16 is equipped with a groove 10 which extends around the inner circumference and is open toward inner ring 17, and whose length in the axial direction corresponds substantially to the dimensions of first sealing element 3 in the same direction.

Support ring 2 has a substantially L-shaped cross section, first sealing element 3 being arranged on an axial projection 19 extending toward rolling elements 18, while second sealing element 5 is joined to the inside delimitation of radial projection 20. Multipole ring 9 is arranged in a region of radial projection 20 that is adjacent to rotational speed sensor 8 in the axial direction.

The magnetized elastomeric material of multipole ring 9 extends radially outward and completely surrounds axial projection 19 on the side facing away from space 14 to be sealed. First sealing element 3 surrounds the end surface of axial projection 19 and sealingly contacts the bottom of groove 10 under radial preload. Static sealing in this region is promoted by the fact that first sealing element 3 is made of a magnetized elastomeric material that has a consequently improved adhesion to outer ring 16 of rolling bearing 15, made of a metallic material. The sheathing of axial projection 19 on the outer radial circumference comes close to the inner circumferential surface of outer ring 16 leaving only a small radial gap, and thus protects first sealing element 3 from the impact of contaminants.

Because a multipole ring 9 made of a magnetized elastomeric material is used, sealing ring 1 is light in weight and therefore has a comparatively low inertial mass, so that the mechanical stresses on sealing ring 1 upon changes in the rotational speed of first machine part 4 are small. The manufacture of sealing ring 1, which is configured as a two-material sealing ring, is simple and economically favorable. The transmission of the rotational movement of first machine element 4 via multipole ring 9 of sealing ring 1 to rotational speed sensor 8 is of consistently high precision over a long service lifetime.

While the invention has been described in the specification and illustrated in the drawings with reference to preferred embodiments, it will be understood by those skilled in the art that various changes may be made and equivalents may be substituted for elements of the invention without departing from the scope of the claims.

What is claimed is:

1. A sealing arrangement comprising:

a first machine element and a second machine element; and a sealing ring comprising:

a support ring extending substantially in a radial direction;

a first sealing element joined to said support ring at a first radial extremity, said first sealing element lying in contact with and nonrotatable with respect to said first machine element to thereby create a static seal;

a second sealing element joined to said support ring at a second radial extremity, said second sealing element being placed against and rotatable with respect to said second machine element to thereby create a dynamic seal, said first and second sealing elements each comprising an elastomeric material; and a multipole ring, said multipole ring being rotatable together with said first machine element about an axis, said multipole ring comprising a magnetizable material, said multipole ring comprising north and south poles alternating in a circumferential direction and extending in a radial direction, said first sealing element and said multipole ring being constructed integrally and continuously with one another and being made of a uniform material.

2. The sealing arrangement of claim 1, wherein:

said first sealing element, said multipole ring, and said second sealing element are adhesively bonded to said support ring, and wherein said multipole ring is arranged on a side of said support ring facing a rotational speed sensor.

3. The sealing arrangement of claim 1, wherein:

said first sealing element and said multipole ring have substantially identical material thicknesses.

4. The sealing arrangement of claim 1, wherein:

said support ring and said first and said second machine elements are each made of a metallic material.

5. The sealing arrangement of claim 1, wherein:

said first machine element comprises a groove open toward said second machine element, and wherein said first sealing element is sealingly braced in said groove.

6. The sealing arrangement of claim 1, wherein:

said second sealing element comprises at least two sealing lips, and wherein said sealing lips are oriented adjacent one another with axial spacing, and wherein an annular cavity is delimited by said sealing lips and said second machine element, and wherein said annular cavity is filled with a barrier grease.

7. The sealing arrangement of claims 1, wherein:

said first sealing element, said multipole ring and said second sealing element completely cover said support ring on a side facing away from a space to be sealed.

8. The sealing arrangement of claim 1, wherein:

said first machine element comprises an outer ring of a rolling bearing in a wheel hub of a motor vehicle, and wherein said second machine element comprises an inner ring of said rolling bearing.

* * * * *